Jan. 27, 1925.
S. J. FREEMAN
1,524,349
HOSE COUPLING
Filed May 3, 1923
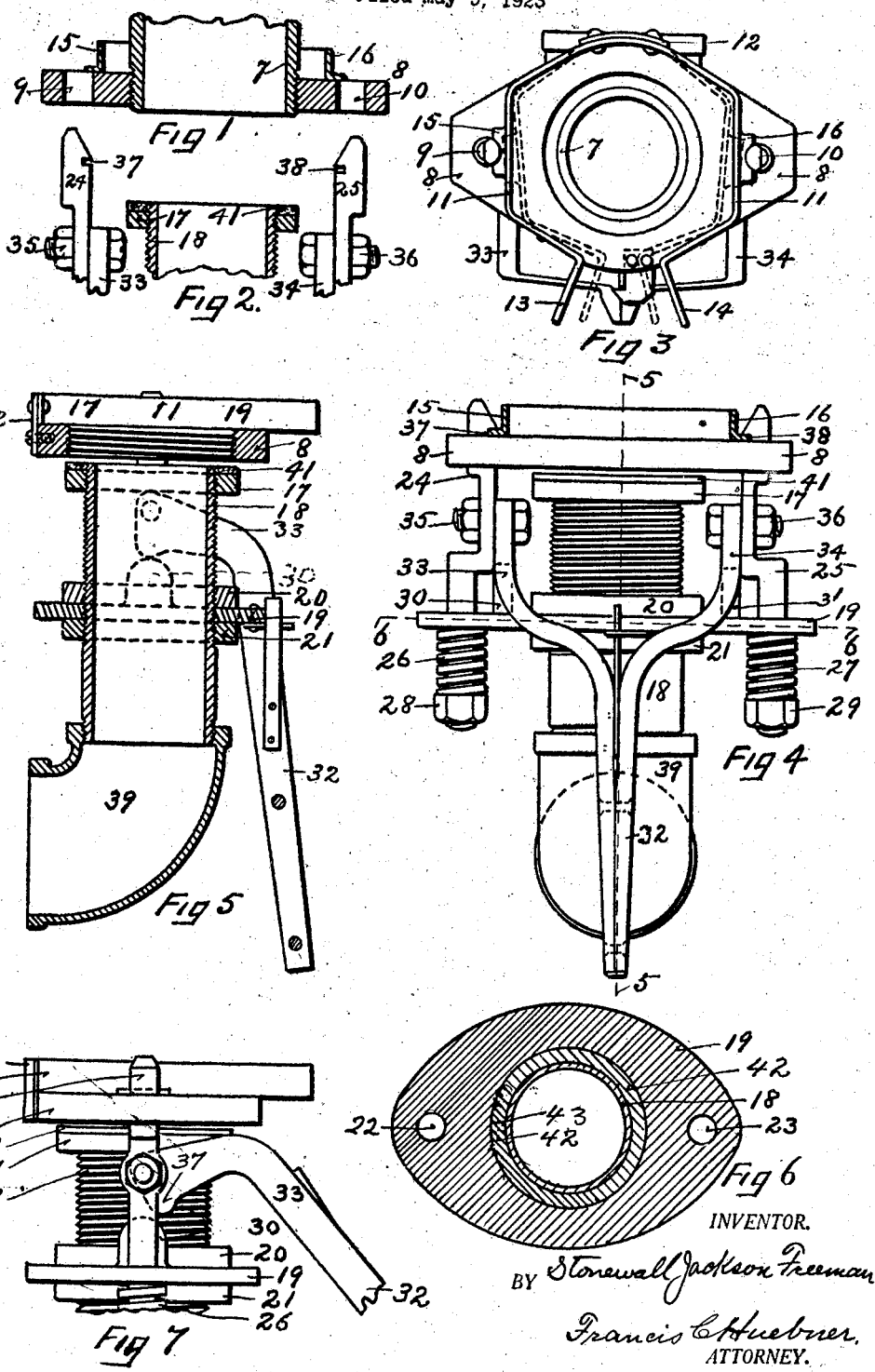
INVENTOR.
BY Stonewall Jackson Freeman
Francis C. Huebner,
ATTORNEY.

Patented Jan. 27, 1925.

1,524,349

UNITED STATES PATENT OFFICE.

STONEWALL JACKSON FREEMAN, OF FRESNO, CALIFORNIA.

HOSE COUPLING.

Application filed May 3, 1923. Serial No. 636,384.

*To all whom it may concern:*

Be it known that I, STONEWALL JACKSON FREEMAN, a citizen of the United States, and resident of Fresno, in the county of Fresno and the State of California, have invented a new and useful Improvement in Hose Couplings, of which the following is a specification.

My invention relates to a hose coupling and has for its object means to quickly, tightly and securely couple the end of a section of hose to an outlet opening. My invention is adapted especially for use in connecting hose to outlets located in positions where it is practically impossible to use a wrench to tighten them. The details of the invention are hereinafter set forth, and disclose other objects which are attained.

The invention consists of the construction hereinafter described and illustrated on the accompanying drawing in which Figures 1 and 2 show partly in section, and disconnected, the assembled flange and outlet opening, and the removable flange and hooks for assembling the parts.

Figure 3 is a top view of the clamping device.

Figure 4 is a side view of the assembled device.

Figure 5 is a side view partly in section along the line 5—5 in Figure 4.

Figure 6 is a sectional view of the base along the line 6—6 in Figure 4.

Figure 7 is a fractional view of the device showing the cam and lever.

In said drawings 7 is the outlet pipe. 8 is a head or flange adapted to be screwed on the pipe 7. Flange 7 has two holes 9 and 10 therethrough spaced apart; a leaf spring 11 is bent so it partially encircles pipe 7, having a bent out portion on each end forming handles 13 and 14.

Spring 11 is attached at its approximate center to a bracket 12 and adjacent to holes 9 and 10 are catches 15 and 16 which normally, partially cover holes 9 and 10 when the spring 11 is expanded, and which can be drawn away from said holes when the spring is contracted. A pipe 18 has a flange 17 at one end and an auxiliary flange or flattened ring 19 a spaced distance therefrom. In the drawing I have shown the flattened ring held in position with nuts 20 and 21, and the spaced relation of ring 19 and flange should be fixed, but the pipe 18 should be permitted to turn freely therein. The center hole 42 of ring 19 is cut larger than the outside diameter of the pipe, and a bearing bushing 43 having a smaller diameter than the nuts 20 and 21 and having an outside diameter approximately the same as the inside diameter of hole 42 is screwed on the pipe between nuts 20 and 21, thus forming a bearing surface for the ring 19 to turn on. Ring 19 has two holes 22 and 23 therein which register with holes 9 and 10. Pins 24 and 25 are constructed so they can slide freely in holes 9 and 22, and 10 and 23 and are of such length that when assembled they extend above head 8 and below ring 19. The upper end of pins 24 and 25 are provided with hooks or notches adapted to engage the catches 15 and 16 on spring 11 when said spring is expanded, and the lower end of said pins are threaded and provided with nuts to support coil compression springs 26 and 27, which encircle the lower ends of pins 24 and 25, and are located between the nuts 28 and 29 and the under surface of ring 19.

On ring 19, adjacent to the holes 22 and 23 are two cams 30 and 31. A cam lever 32 has two branches, 33 and 34 which are pivoted to the pins 24 and 25 by means of bolts shown on the drawing as 35 and 36. The branches of the cam lever are provided with eccentrics 37 and 38 which engage with cams 30 and 31 when the lever 32 is moved. When the lever is lowered the springs 26 and 27 are compressed and portion of the pins 24 and 25 above the ring 19 are lengthened. 39 is an ordinary pipe elbow.

In assembling this device for use the head 8 is first screwed on the pipe outlet. The lever 32 is then lowered which raises the pins 24 and 25 in relation to the ring 19. The under portion of the connection is then placed in position with the pins emerging through holes 9 and 10 until the notches in the pins engage with the catches 15 and 16. When in this position the depending pipe and elbow 39 can be easily turned in any direction desired, and then by raising the lever 32, disengaging the eccentrics with the cams, the flange 17 will be pressed against the head 8. The construction of the parts should be such that the hole in pipe 18 and in the outlet 7 will register and flange 17 has a less diameter than the distance between holes 9 and 10. In order to make an oil tight fit a gasket 41 can be placed on the top of flange 17.

It will be noted that this coupling is especially adapted for cars and tanks in which oil, water and fluids are generally transported as the outlets of such cars are frequently in positions where it is very difficult to use a wrench to attach and detach the ordinary forms of couplings.

When it is desired to remove the coupling the lever 32 is depressed, thus increasing the tension of the springs 26 and 27, and then by compressing handles 13 and 14 the catches 15 and 16 disengage with the notches in pins 24 and 25, and the lower part of the connection will detach itself by its own weight.

Having described my invention I claim:

In a hose coupling the combination of a head adapted to be attached to the outlet pipe, said head having holes a spaced distance apart, and catches adapted to cover portions of the holes by spring means, means for releasing the catches, a connection consisting of a pipe having a flange and a base, holes in the base spaced to register with the holes in the head when the coupling is assembled, pins extending through the holes in the head and in the base, the upper end of each pin having a notch adapted to engage the catch, and the lower end of each pin provided with a seat for a spring, and compression springs adapted to yieldably pull the pins downward, and means for compressing the springs, substantially as described.

STONEWALL JACKSON FREEMAN.